3 Sheets—Sheet 1.

L. MÉKARSKI.

Assignor to SOCIETÉ GENERALE DES MOTEURS À AIR COMPRIME.

Devices for Using Compressed Air for Motive-Power.

No. 8,683. Reissued April 22, 1879.

Witnesses:
John C. Tunbridge
D. Briesen

Inventor:
Louis Mékarski
by his attorney
A. v. Briesen

L. MÈKARSKI.

Assignor to SOCIETÉ GENERALE DES MOTEURS À AIR COMPRIMÉ.

Devices for Using Compressed Air for Motive-Power.

No. 8,683. Reissued April 22, 1879.

Witnesses:
John C. Tunbridge
F. V. Briesen

Inventor:
Louis Mèkarski
by his attorney
Otto Briesen

3 Sheets—Sheet 3.

L. MÉKARSKI.

Assignor to SOCIETÉ GENERALE DES MOTEURS À AIR COMPRIMÉ.

Devices for Using Compressed Air for Motive-Power.

No. 8,683. Reissued April 22, 1879.

Witnesses:
John G. Tunbridge
D. Briesen

Inventor:
Louis Mékarski
by his attorney
A. v. Briesen

UNITED STATES PATENT OFFICE.

LOUIS MÉKARSKI, OF PARIS, FRANCE, ASSIGNOR TO SOCIETÉ GENERALE DES MOTEURS Á AIR COMPRIMÉ, OF SAME PLACE.

IMPROVEMENT IN DEVICES FOR USING COMPRESSED AIR FOR MOTIVE POWER.

Specification forming part of Letters Patent No. 177,736, dated May 23, 1876; Reissue No. 8,683, dated April 22, 1879; application filed December 3, 1878.

*To all whom it may concern:*

Be it known that I, LOUIS MÉKARSKI, of Paris, France, have invented a new and Improved Apparatus for using Compressed Air for Motive Power, of which the following is a specification.

Figure 1:
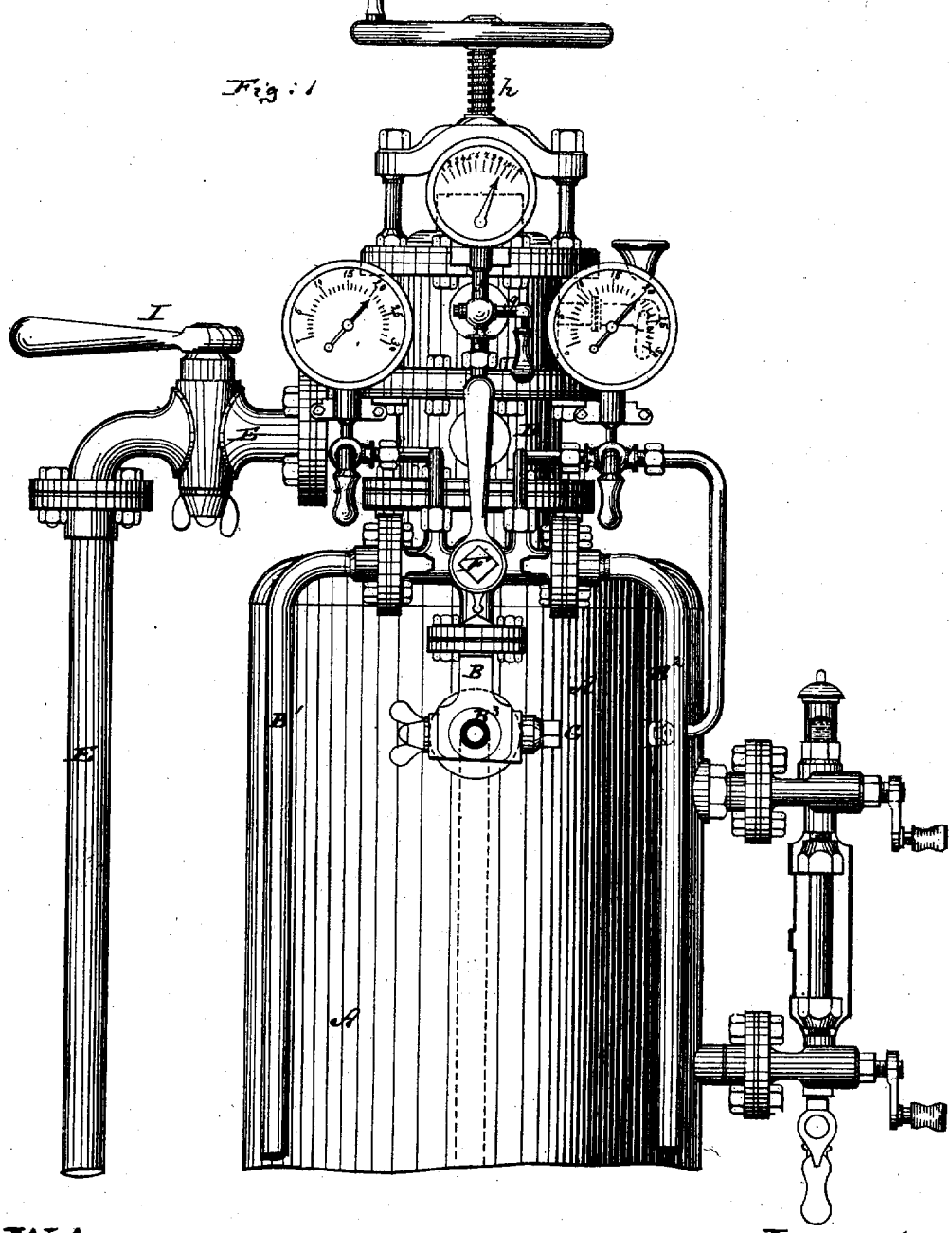
Figure 2:
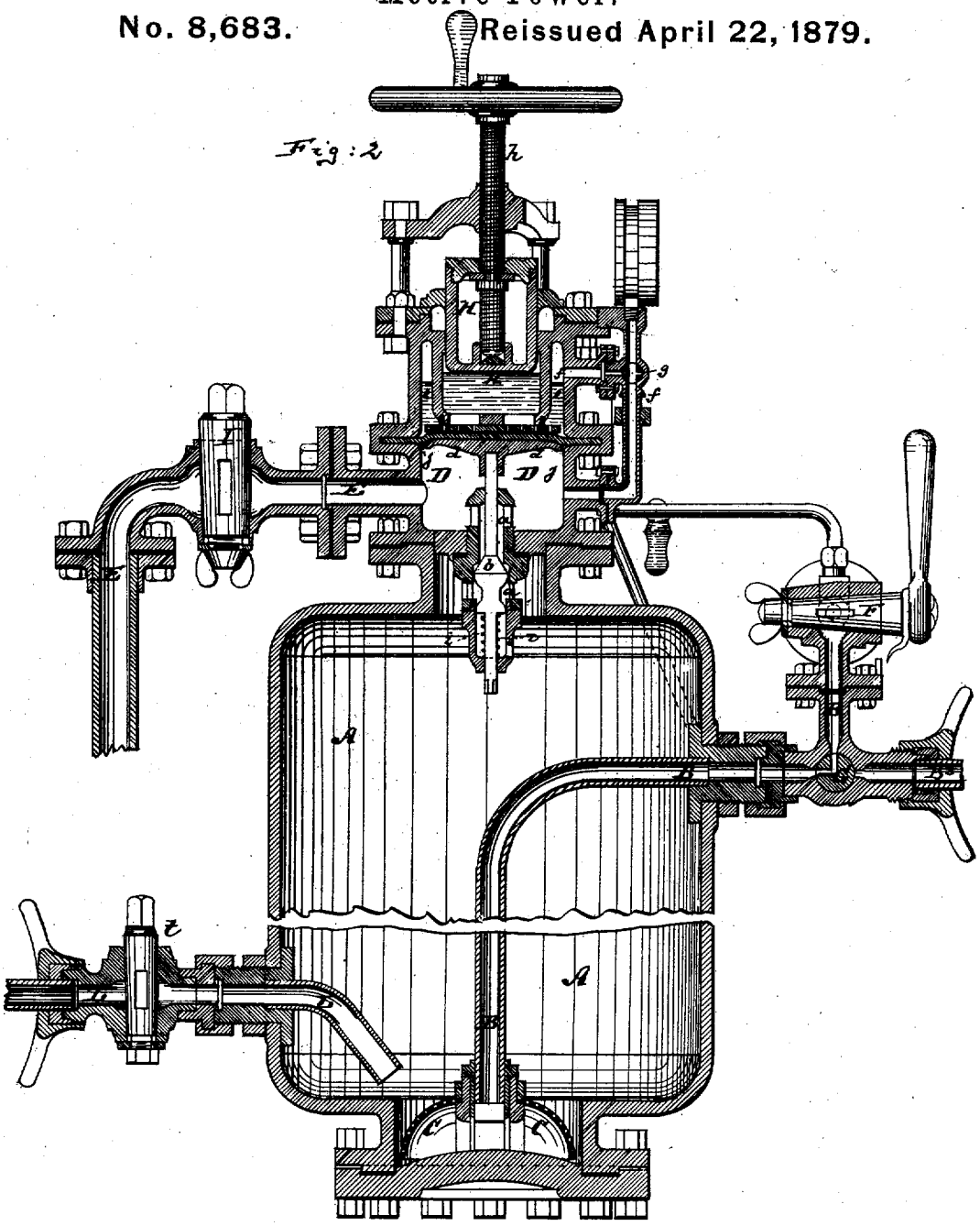
Figure 3:
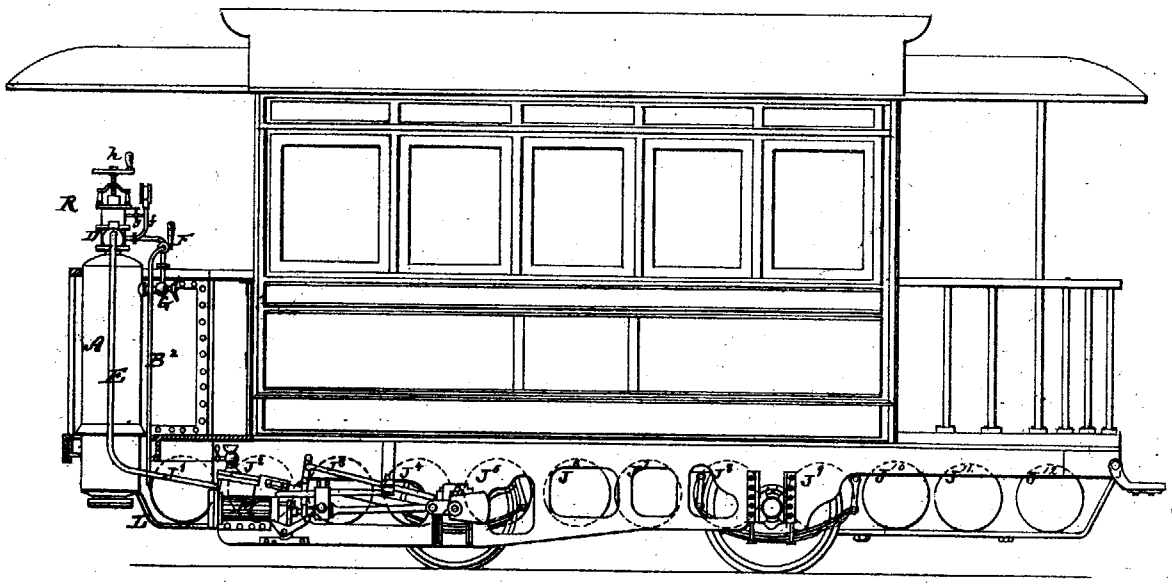

In the accompanying sheets of drawings, Figure 1 represents an elevation of my improved compressed-air apparatus. Fig. 2 is a vertical central section of the same. Fig. 3 is a side view of a railway-car provided with my improved apparatus.

Similar letters of reference indicate corresponding parts in all the figures.

My invention, which, as the title indicates, relates to a new apparatus for using comprsssed air as a motive power, consists of a new arrangement of parts for heating and adding steam to the compressed air immediately upon its entry into the last compressed-air reservoir. This means is the combination of the heater with two pipes, the one supplying the compressed air with a certain quantity of moisture in one continuous process, and I consequently impart to the compressed air a degree of tension and elasticity which, united with the increase of temperature, renders the air much more useful for motive power than it would otherwise be, for the tension of the steam in the reservoir is fully utilized in conjunction with that of the air.

I am aware that previous to my invention compressed air to be used for motive power has already been heated; but it has never, so far as I am aware, had its tension and elasticity increased together with its temperature by the supply of steam within the heater. An additional advantage of this joint use of compressed air and steam is that it renders the pistons, valves, and other moving parts of the apparatus properly tight by the water condensing thereon, while with compressed air alone it is exceedingly difficult to make the joints sufficiently tight.

Although capable of general application, this invention has chiefly for its object to render practicable the employment of compressed air for locomotives and for other purposes where it is necessary to utilize in the best manner possible a limited supply of air inclosed under a high pressure in a reservoir, and renewable only at certain intervals. The said invention comprises also an automatic distributing apparatus, which I term a "discharge-regulator," for distributing the air which flows from a reservoir, where the pressure changes in decreasing to a fixed pressure lower than that of the reservoir, but which can be caused to vary instantaneously within certain wide limits, so that I can proportion at any moment the power of the engine to the resistance it has to overcome.

In respect to the construction, Fig. 2, of said automatic and adjustable regulator, the invention consists in combining and connecting the valve which leads from the heater into the supply-chamber with the lower side of a flexible diaphragm, the upper side of which is exposed to the action of a spring. This arrangement serves to automatically balance the diaphragm, and with it the valve, and additional pressure is exerted above the diaphragm by an adjustable piston, which can be moved up or down by hand, and serves to compress the air, which acts as a spring above the diaphragm to a suitable greater degree than it is below the same.

The invention also consists in interposing a water-cushion between the said diaphragm and the compressed air above the same and between said diaphragm and said piston to prevent leakage.

The heater can be as above described—that is to say, filled with hot water and steam at intervals, or heated continuously by any suitable means, and filled with water to the proper height.

The regulator hereinafter described may either be placed between the heater and the motor or behind the heater, so that the latter will be between the regulator and the motor; but I prefer to place it, as shown in the drawings, between the regulator and the motor.

In the drawings, the letter A represents the heater receiving the compressed air through a tube, B, which terminates in or meets a rose, C, whereby the air is divided into fine jets, which rise through the heated liquid contained in the heater A, and reunite in the heater above the water therein contained. From the heater A the compressed air enters through a pipe or orifice, *a*, into the chamber D of the regulator, and thence by a pipe, E, into the motor.

L is a pipe leading into the reservoir, and provided with a cock, *t*. This pipe L serves to supply the heater A with the requisite amount of steam and water. The pipe B, which connects the heater A with the compressed-air-supply tanks, as in Fig. 1, preferably branches into two pipes, $B^1$ and $B^2$, and has a cock, F, at the junction, so that by said cock the heater A may be caused to communicate with either one of the two branches, $B^2$ or $B^3$, and thereby with either one of two supply-tanks. That one of said tanks which for the time being is disconnected from the heater A serves as a reserve, and may be recharged while the other is in operation. By another cock, G, in the unbranched part of the pipe B, communication with the tank is established or intercepted at will. The cock G can also be used while intercepting communication between the reservoir A and the supply-tanks, to cause the latter to communicate by a pipe, $B^3$, with the pump or other air-compressing mechanism whereby the tanks are charged.

To regulate the section of the orifice *a*, by which the air flows from the heater A into the chamber D, a valve or slide, *b*, is employed, whose heat is in the pipe or orifice *a*, and whose stem is connected with a movable partition or piston, *d*. This partition or piston is on one side subjected to the pressure of the air in the chamber D, and on the other (upper) side to a spring, whose tension is determined arbitrarily.

The said spring consists of a certain quantity of compressed air inclosed in the space *e* above the partition or piston *d*, and conducted thither by a pipe, *f*, which leads from the chamber D into the space *e*, as shown in Fig. 2.

A cock, *g*, is placed in the pipe *f* to enable the closing of the same and the confinement within the space *e* of a certain desired quantity of the air having a certain tension.

The cock *g* may be a three-way cock to supply, also, a suitable gage.

The pressure of the air in the space or chamber *e* is arbitrarily regulated by the movement of a piston, H, which can be moved up or down by a suitable screw, *h*, and which fits closely into an opening in the chamber *e*. When lowered the piston H compresses the air in the chamber *e*, and tends thereby to lower the partition *d*, and to maintain thereby, also, a corresponding pressure in the chamber D, which communicates with motor by the pipe E and by a distributing-cock, I, placed in said pipe E.

The valve *b* follows automatically the variations of the discharge, closing completely the orifice *a* whenever the discharge ceases.

To insure the closing of the valve *b* during the filling of the heater A, I apply to it a small spring, *i*, which crowds it against its seat, unless the partition *d* moves it off said seat.

In order to insure a proper separation of the chambers D and *e*, I place the partition or piston *d* against an india-rubber diaphragm, *j*, which is interposed between said chambers, as shown in Fig. 2.

Finally, to prevent the leakages which may be produced through the packing traversed by piston H, the said piston is only made to act indirectly upon the air-spring by means of an interposed cushion of water, which it causes to flow in the annular chamber *e*. This water, which fills the central space wherein the piston moves when the latter is at the top of its stroke, is admitted by a suitable funnel.

By this invention I provide a motor which does not present any of the inconveniences accompanying the employment of steam, and may be applied advantageously to a great number of operations, especially to the working of railways laid in towns, and upon roads for the interior service of mines or for traversing long tunnels.

The capability of augmenting instantaneously the power of the engine in varying either the pressure, the expansion, or both together, will render these vehicles capable of ascending the steepest gradients. The division of the tank into two parts, whereof one forms the reserve, permits also the reservation of this available force to the last moment.

The most important result of this invention is the possibility of storing the air in carriages at a very high pressure, (thirty-five atmospheres or higher,) permitting a long journey without recharging the reservoirs. Nevertheless, in certain cases where it is desirable to reduce the dead weight in diminishing the number or size of the reservoirs, the charging may be effected more frequently by means of supplies of air arranged along the road at suitable distances, and attached to tubes or passages fed by the compressing-works.

For the illustration of the application of the preceding, I show in Fig. 3, as an example, the general arrangement of a type of self-moving carriages constructed according to this invention.

$J^1$ $J^2$ $J^3$, &c., are the tanks of air placed under the frame. $J^1$ and $J^2$ compose the reserve, the others the main store.

A is the heater, whose details are shown in Figs. 1 and 2. This apparatus is placed at the front of the carriage upon the first platform. R is the regulator. M is the motor mechanism, fixed laterally at each side of the frame upon sleepers of plate-iron or other suitable metal, properly mounted and placed in front of the driving-axle, to effect an equilibrium to the load of the passengers gathered upon the rear platform. The body of the car is adapted to receive the passengers. The front platform is reserved to the engineer, and the rear one is for passengers to stand upon.

I claim as my invention—

1. The combination of the air-heater A with the air-supply pipe B and with the steam-supply pipe L, the air-heater constituting also a water-receptacle, substantially as herein shown and described.

2. The combination of the air-heater A and pipe B with the branch pipes $B^1$ and $B^2$ and cocks F and G, substantially as herein shown and described.

3. The combination of the pipe $B^3$ and cock G with the pipe B, reservoir A, and branch pipes $B^1$ and $B^2$, substantially as herein shown and described.

4. The combination of the chamber D with its inlet-valve *b*, and with the movable partition or piston *d*, which is subjected on one side to the pressure of the air in the chamber D, and on the other side to a spring, whose tension is arbitrarily adjusted, substantially as herein shown and described.

5. The combination of the chamber D and movable partition or piston *d* with the chamber *e*, and with the connecting-pipe *f*, substantially as herein shown and described.

6. The combination of the chamber D and movable partition *d* with the chamber *e*, connecting-pipe *f*, and cock *g*, substantially as herein shown and described.

7. The piston H, combined with the chamber *e*, movable partition *d*, chamber D, and valve *b*, substantially as herein shown and described.

8. The combination of the chamber D and valve *b* with the flexible diaphragm *j* and upper chamber, *e*, substantially as and for the purpose herein shown and described.

9. The combination of the valve *b*, spring *i*, and partition *d* with the piston H and chambers D and *e*, substantially as herein shown and described.

10. The combination of the piston H, air-chamber *e*, and movable partition *d* and the diaphragm with the water-cushion interposed between said piston and the compressed air in said chamber, substantially as herein shown and described.

L. MÉKARSKI.

Witnesses:
ROBT. M. HOOPER,
DAVID T. S. FULLER.